(12) United States Patent
Czarnecki

(10) Patent No.: US 8,885,328 B1
(45) Date of Patent: Nov. 11, 2014

(54) TRANSFER SWITCH HOUSING HAVING REAR WALL MOUNTED SWITCHES

(75) Inventor: Neil A. Czarnecki, Mt. Pleasant, WI (US)

(73) Assignee: Reliance Controls Corporation, Racine, WI (US)

( * ) Notice: Subject to any disclaimer, the term of this patent is extended or adjusted under 35 U.S.C. 154(b) by 241 days.

(21) Appl. No.: 13/558,534

(22) Filed: Jul. 26, 2012

(51) Int. Cl.
*H02B 1/20* (2006.01)

(52) U.S. Cl.
USPC ............ 361/656; 361/641; 361/648; 361/652

(58) Field of Classification Search
USPC .......... 361/641, 644, 648, 652, 655–656, 658
See application file for complete search history.

(56) References Cited

U.S. PATENT DOCUMENTS

| | | | |
|---|---|---|---|
| 3,972,579 A | 8/1976 | Kohaut | |
| 4,423,336 A * | 12/1983 | Iverson et al. | 307/64 |
| 5,122,069 A | 6/1992 | Brownlie et al. | |
| 5,148,348 A * | 9/1992 | White | 361/658 |
| 5,342,993 A | 8/1994 | Siems | |
| 5,369,548 A | 11/1994 | Combs | |
| 5,575,668 A | 11/1996 | Timmerman | |
| 5,640,295 A | 6/1997 | Harris et al. | |
| 5,761,027 A | 6/1998 | Flegel | |
| 5,895,981 A * | 4/1999 | Flegel | 307/64 |
| 5,984,719 A | 11/1999 | Flegel | |
| 6,028,267 A | 2/2000 | Byrne | |
| 6,028,268 A * | 2/2000 | Stark et al. | 174/67 |
| 6,046,405 A | 4/2000 | Obermann | |
| 6,066,817 A | 5/2000 | Flegel | |
| 6,085,667 A | 7/2000 | Gevaert et al. | |
| 6,107,701 A | 8/2000 | Flegel | |
| 6,121,897 A | 9/2000 | Flegel | |
| 6,163,449 A | 12/2000 | Flegel | |
| 6,293,821 B1 | 9/2001 | Flegel | |
| 6,365,990 B2 | 4/2002 | Flegel | |
| 6,414,240 B1 | 7/2002 | Flegel | |
| 6,504,268 B1 | 1/2003 | Flegel | |
| 6,534,735 B1 | 3/2003 | Czarnecki | |
| 6,564,427 B1 | 5/2003 | Flegel | |
| 6,613,995 B1 | 9/2003 | Czarnecki et al. | |
| 6,624,534 B1 | 9/2003 | Flegel | |

(Continued)

OTHER PUBLICATIONS

"Pro/Tran(R) Manual Transfer Switches for Portable Generators", Reliance Controls Corporation, 2001 Young Court, Racine, WI 53404, 2003.

(Continued)

*Primary Examiner* — Robert J Hoffberg
(74) *Attorney, Agent, or Firm* — Boyle Fredrickson, S.C.

(57) ABSTRACT

A power transfer device adapted for interconnection with the electrical system of a building includes a cabinet, a set of switches mounted to the cabinet, and wires adapted to connect the switches to an electrical distribution panel associated with a building electrical system. The power transfer device includes a first compartment and a second compartment partitioned from one another by a removable intermediate wall that slidably engages a base that defines a back wall of the cabinet. The switches are secured to a base of the cabinet and a first panel closes the first compartment and cooperates with the set of switches such that the switches are operable through the first panel and discrete switches can be removed from the cabinet when the first panel is the removed from cabinet without interfering with an orientation of other switches relative to the cabinet.

20 Claims, 5 Drawing Sheets

(56) References Cited

U.S. PATENT DOCUMENTS

| | | |
|---|---|---|
| 6,674,031 B1 | 1/2004 | Flegel |
| 6,798,187 B1 | 9/2004 | Czarnecki |
| 7,136,278 B2 | 11/2006 | Allen |
| 7,292,433 B2 * | 11/2007 | Johnson et al. ............... 361/627 |
| 7,405,923 B2 | 7/2008 | Kelly et al. |
| 7,449,645 B1 | 11/2008 | Flegel |
| 7,462,791 B1 | 12/2008 | Flegel |
| 7,531,762 B2 | 5/2009 | Flegel |
| 7,766,695 B1 | 8/2010 | Czarnecki et al. |
| 7,772,723 B1 | 8/2010 | Flegel |
| 7,800,512 B1 | 9/2010 | Czarnecki |
| D648,282 S * | 11/2011 | Czarnecki et al. ........... D13/152 |
| 8,305,738 B1 * | 11/2012 | Czarnecki ..................... 361/622 |
| 8,310,818 B1 * | 11/2012 | Czarnecki ..................... 361/622 |
| 8,395,884 B1 * | 3/2013 | Czarnecki ..................... 361/643 |
| 8,559,167 B1 * | 10/2013 | Czarnecki ..................... 361/643 |
| 8,755,172 B1 * | 6/2014 | Czarnecki ..................... 361/622 |

OTHER PUBLICATIONS

"Pro/Tran(R)—CSR Series Manual Transfer Switches", Reliance Controls Corporation, 2001 Young Court, Racine, WI 53404, undated.

"Pro/Tran(R)—'Signa' Series Manual Transfer Switches for Traffic Signal Applications", Reliance Controls Corporation, 2001 Young Court, Racine, WI 53404, undated.

* cited by examiner

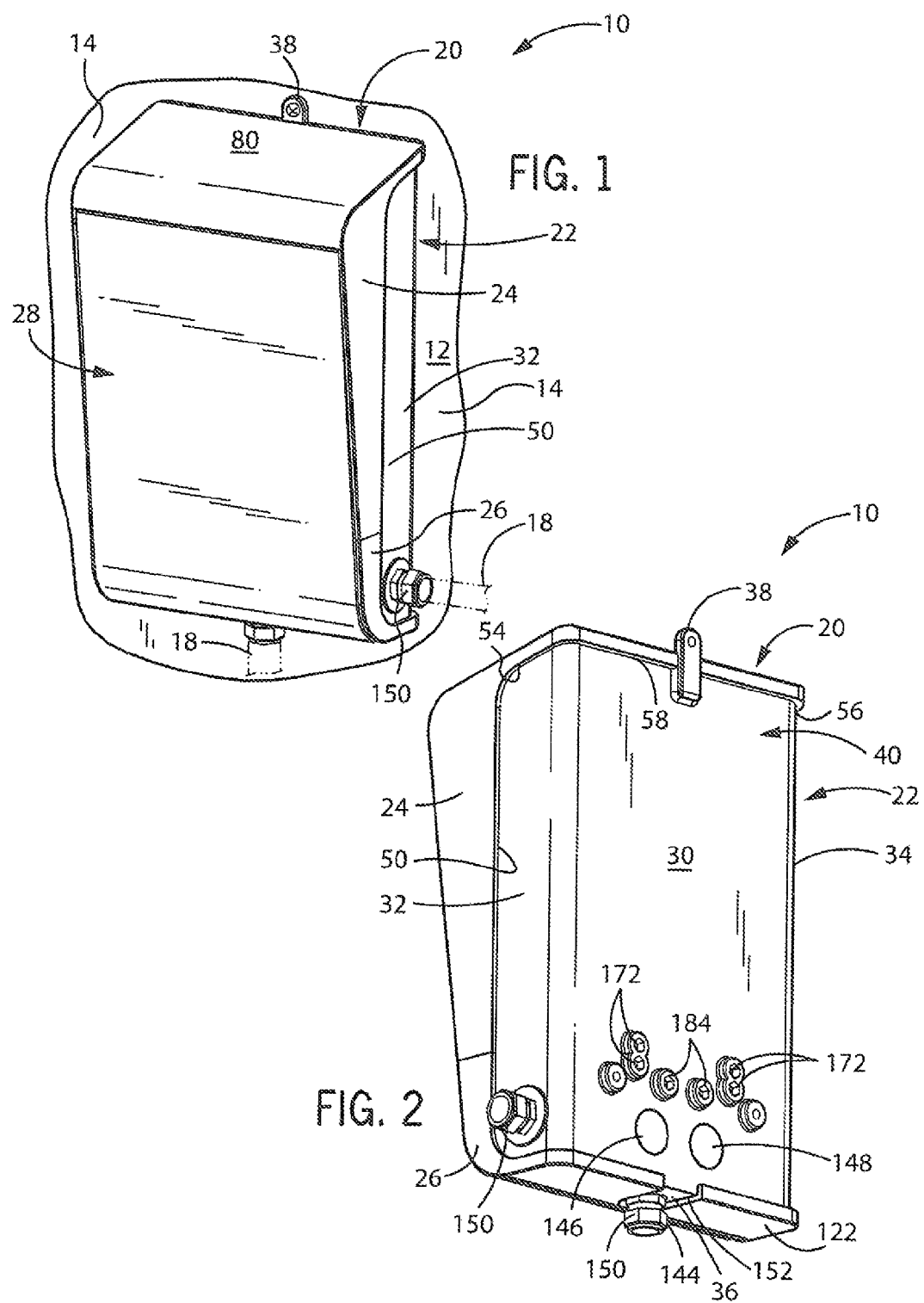

TRANSFER SWITCH HOUSING HAVING REAR WALL MOUNTED SWITCHES

BACKGROUND AND SUMMARY OF THE INVENTION

This invention relates to a power supply arrangement for providing auxiliary power to the electrical system of a building, such as from a standby generator or the like.

Portable generators are used in certain situations to supply electrical power to residential and commercial load circuits during a utility power outage. A system for interconnecting the generator with the load center of a building typically includes a power inlet box having a receptacle for receiving a plug extending from the generator.

The power inlet box is typically mounted to the exterior of a building, and is adapted for connection to a transfer switching mechanism which establishes an electrical path between the generator and the load center. The transfer switching mechanism typically includes a series of switches and circuit breakers, which are operable to supply power to certain selected circuits of the load center. The circuits of the transfer switching mechanism are wired to selected circuits of the load center, through wiring housed within a conduit extending between the transfer switching mechanism and the load center.

A typical transfer switching mechanism includes a housing provided with a power input receptacle. The remote power inlet box may be wired to a power cord connected to a junction box, and the power cord is engageable with the power input receptacle of the transfer switching mechanism so as to provide power to the transfer switching mechanism from the generator. An alternative arrangement is illustrated in Flegel U.S. Pat. No. 5,895,981 issued Apr. 20, 1999, the entire disclosure of which is hereby incorporated by reference. In the '981 patent, the transfer switching mechanism includes a terminal compartment within which a set of terminals is located. The terminals are wired to the switches of the transfer switching mechanism. A set of power input wires extends from the power inlet box, and into the terminal compartment of the transfer switching mechanism. The ends of the power input wires are connected to the terminals, to establish a direct, non-plug type connection between the power inlet box and the transfer switching mechanism.

U.S. Pat. No. 6,414,240 issued to Flegel on Jul. 2, 2002, the entire disclosure of which is hereby incorporated by reference, describes a power transfer switching mechanism that includes a cabinet defining an internal cavity within which a series of switches are mounted. One or more lead wires are connected to the switches, and define ends which extend into a compartment. The compartment is accessible through an opening associated with the cabinet, and a cover is selectively positionable over the opening to provide or prevent access to the compartment. With the cover removed, the lead wires can be connected to power input wires in a conventional manner, e.g., using wire-to-wire connectors, and the wires and the connectors may then be placed within the compartment and concealed by attaching the cover to the cabinet.

Commonly owned U.S. patent application Ser. No. 12/897,354, now issued as U.S. Pat. No. 8,310,818, titled "Transfer Switch Housing Having a Removable Wall For Segmenting the Housing Into A Pair of Compartments," the entire disclosure of which is incorporated herein, provides a power transfer switching mechanism that improves upon the advancements to the art provided by the '240 patent to Flegel. More particularly, the power transfer switching mechanism disclosed in the '354 Application includes a housing having a base that defines an internal cavity that is segmented into first and second compartments, which may be in the form of upper and lower compartments, by an intermediate and removable wall member. The base is generally defined by a back wall and a pair of sidewalls extending outwardly from the back wall, and which may be integrally formed with the back wall. A mating engagement arrangement is interposed between the base and the intermediate wall member. The mating engagement arrangement may be in the form of a channel formed along the inner surface of the back wall and along facing inner surfaces of the sidewalls, and functions to partition the base into first and second sections, which may be an upper section and a lower section. The intermediate wall member has an opening that defines a passageway between the first and second sections for passing wires between the first and second sections.

The housing includes an enclosure arrangement that is engaged with the base and the intermediate wall member and which is configured to enclose the interior of the housing. In one embodiment, the enclosure arrangement includes a first (or upper) panel that engages portions of the sidewalls and the intermediate wall member, and that is configured to fit over the first section to define the first or upper compartment. In a similar fashion, the enclosure arrangement includes a second (or lower) panel that engages portions of the sidewalls and the intermediate wall member, and that is configured to fit over the second or lower section to define the second or lower compartment. The panels may have end wall portions that, in one embodiment, define a top and bottom of the housing when engaged with the base. The plurality of switches associated with communicating power through the transfer switch housing are supported or otherwise positionally secured to a front face that removably cooperates with the intermediate wall member such that removal of the front face exposes those portions of the various switches and/or breakers that are generally behind the front face and such that all the switches associated with the enclosure arrangement translate relative to the base during movement of the intermediate wall.

The present invention provides a further improvement of a transfer switch assembly wherein various switches or breakers are supported and electrically connected by a bus bar associated with the rear wall of the enclosure space such that a movable cover and a front face member or panel can be removed from the transfer switch assembly without effecting the position and orientation of the various electrical switches and/or power indicators relative to the base of the transfer switch assembly, thereby allowing manipulation or service of discrete breaker elements relative to the transfer switch assembly without exposing the electrical connections associated with a service panel. Representatively, the transfer switch assembly is configured to receive and operate with one or more 1-inch interchangeable breakers. The transfer switch assembly may be configured for operation with one or more, 1-inch circuit interrupters, 1-inch ground fault circuit interrupters (GFCI), 1-inch arc fault circuit interrupters (AFCI), and/or combinations thereof. Such a configuration provides a transfer switch assembly having a switch and breaker assembly that is more readily serviceable and provides improved arc and ground fault circuit protect.

In one aspect, the present invention contemplates a power transfer device adapted for interconnection with the electrical system of a building. The power transfer device includes a cabinet, a set of switches mounted to the cabinet, and wires adapted to connect the switches to an electrical distribution panel associated with a building electrical system. The power transfer device includes a first compartment and a second compartment partitioned from one another by a removable intermediate wall that may slidably engages a base that defines a back wall of the cabinet. The set of switches removably cooperate with a bus bar secured to the back wall of the base of the cabinet. A first panel closes the first compartment and cooperates with the set of switches such that the switches are operable through the first panel and discrete switches can be removed from the cabinet when the first panel is the removed from cabinet without interfering with an orientation of other switches relative to the cabinet.

Another aspect of the invention that includes one or more features combinable with the above aspects contemplates a power transfer arrangement having a base member that includes a back wall that defines first and second ends of the base. An intermediate wall is engaged with the base member at a location between the first and second ends of the back wall. An enclosure arrangement is engaged with the base member and with the intermediate wall. The enclosure arrangement cooperates with the base member to define an interior of the power transfer arrangement, and the intermediate wall is configured to separate the interior of the power transfer arrangement into a first interior section and a second interior section. Power transfer switching components are disposed in the first interior section and carried by the base. The power transfer switching components are accessible through the enclosure arrangement when the enclosure arrangement is engaged with the base.

Another aspect of the invention combinable with one or more of the above aspects contemplates a transfer switch arrangement that includes a base having a first section and a second section. An intermediate wall removably engages the base and defines an end of the first section and an end of the second section. An enclosure arrangement cooperates with the first section of the base and the intermediate wall to define a first compartment, and also cooperates with the second section of the back wall and the intermediate wall to define a second compartment. One or more power transfer switching components, which have switch bodies disposed between the enclosure arrangement and the base, removably cooperate with a bus bar that is secured to a rear wall of the base in the first compartment.

Various other features, aspects, and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a front isometric view of a power transfer device adapted for connection in an auxiliary power supply arrangement for communicating power between a utility power source, an auxiliary power source, and discrete load circuits of a building and incorporating a housing constructed according to the present invention and shown with a moveable cover associated with the housing of the power transfer device in a lowered or closed position;

FIG. 2 is a rear isometric view of the power transfer device of FIG. 1;

DETAILED DESCRIPTION OF THE INVENTION

Figure 3:
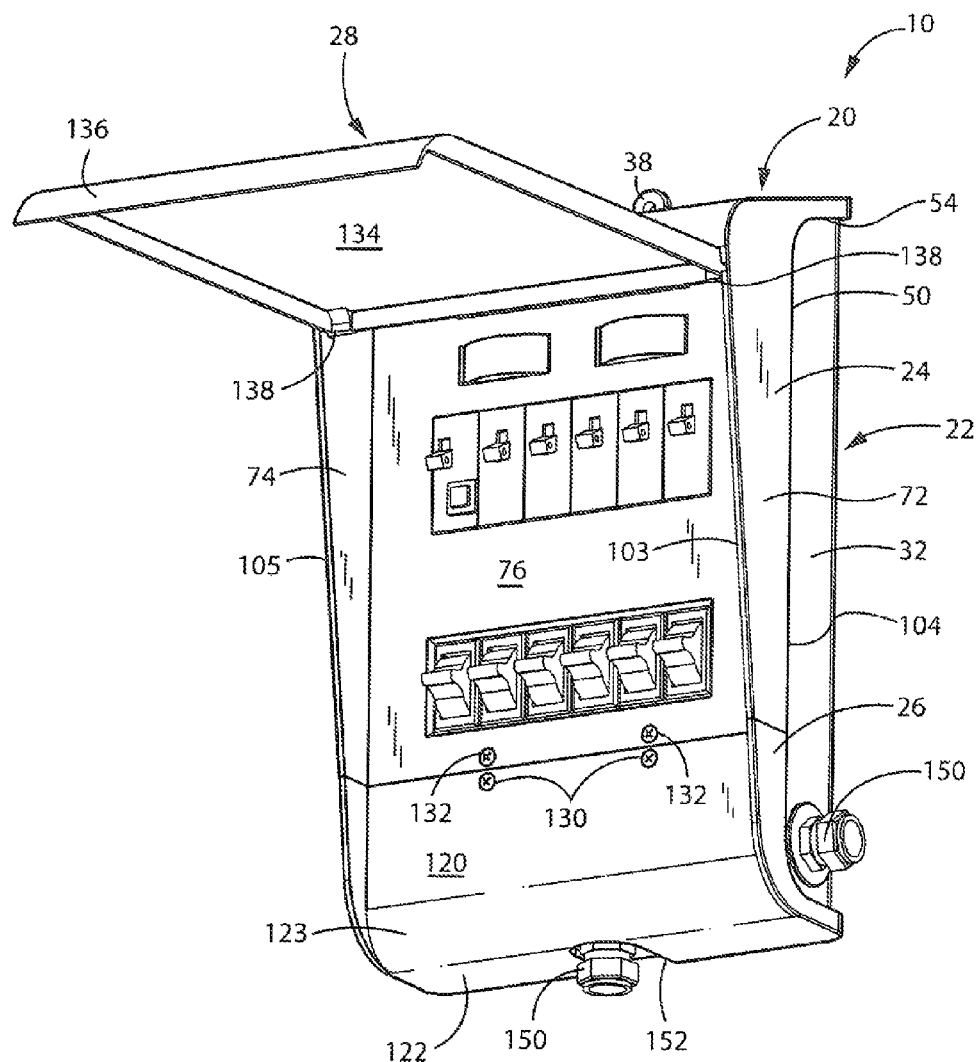
FIG. 3 is a view similar to FIG. 1 with the moveable cover in a raised or open position to expose various power indicating and transfer switching components of the power transfer device.

FIG. 1 shows a power transfer device, mechanism, or assembly 10 according to a representative embodiment of the present invention. Power transfer assembly 10 can be secured to an interior or an exterior surface 12 of a structure such as a building 14. Power transfer device 10 is configured to provide a power inlet arrangement for interconnecting an auxiliary power source, such as a portable generator, with a main electrical panel or load center commonly located in the interior of building 14. The cooperation and operation of a portable generator with the load center of a building to provide isolated power to discrete or selected circuits associated with the electrical system of building 14 is described further in Applicant's co-pending U.S. patent application Ser. No. 12/897,354, now issued as U.S. Pat. No. 8,310,818, filed on Oct. 4, 2010, the entire disclosure of which is hereby incorporated by reference in the present application. In various prior art power inlet arrangements, such as that disclosed in U.S. patent application Ser. No. 12/897,354, now issued as U.S. Pat. No. 8,310,818, power transfer device 10 is electrically connected via a series of wires between a facility main power panel and an auxiliary power source, such as a portable generator or the like. One or more conduits 18, or sheathed multi-conductor electrical wires extend between the facility main power panel, power transfer device 10, and the auxiliary power source to selectively communicate power to one or more of the electrical circuits of the facility during interruption of utility power.

Referring to FIGS. 1-3, power transfer switching assembly 10 according to one embodiment of the present invention includes a housing 20 defined by a base 22, a first, or upper panel 24, a second, or lower panel 26, and a cover 28. The base 22 and the first and second panels 24, 26 collectively define an interior volume that is further compartmentalized, as described further herein. The base 22 is defined by a rear or back wall 30, a pair of sidewalls 32, 34 and a lower wall 36, which in one embodiment are integrally formed as a single unitary structure. Sidewalls 32, 34 and lower wall 36 may be oriented to extend in a common transverse direction with respect to the plane of back wall 30. A hanging tab 38 extends from an upper end 40 of the back wall 30 for mounting the power transfer switching mechanism 10 to the surface 12 of a wall or other mounting structure associated with building 14.

As noted above, the construction of the back wall 30 and the sidewalls 32, 34 forms a series of planar surfaces that provide a seat for first panel 24. More particularly, sidewalls 32, 34 extend outwardly from the back wall 30 generally along a plane that is perpendicular to the plane of the back wall 30. As a result, each sidewall 32, 34 has a first outer edge 50, 52, respectively, and a second outer edge 54, 56, respectively. The second outer edges 54, 56 may be generally perpendicular to the first outer edges 50, 52, respectively, or may be formed so as to have an incline from front-to-back. The upper end of the back wall 30 also defines an outer edge 58 that is generally perpendicular to the first outer edges 50, 52. The first outer edges 50, 52 extend along the length of the sidewalls 32, 34, respectively, and therefore run from the upper end of the back wall 30 to the lower wall 36. In a representative embodiment, when assembled, edges 50, 52, 54, 56, 58 of base 22 slightly underlie first and second panels 24, 26 so as to form a sealed and/or weather tight connection therebetween.

Figure 4:
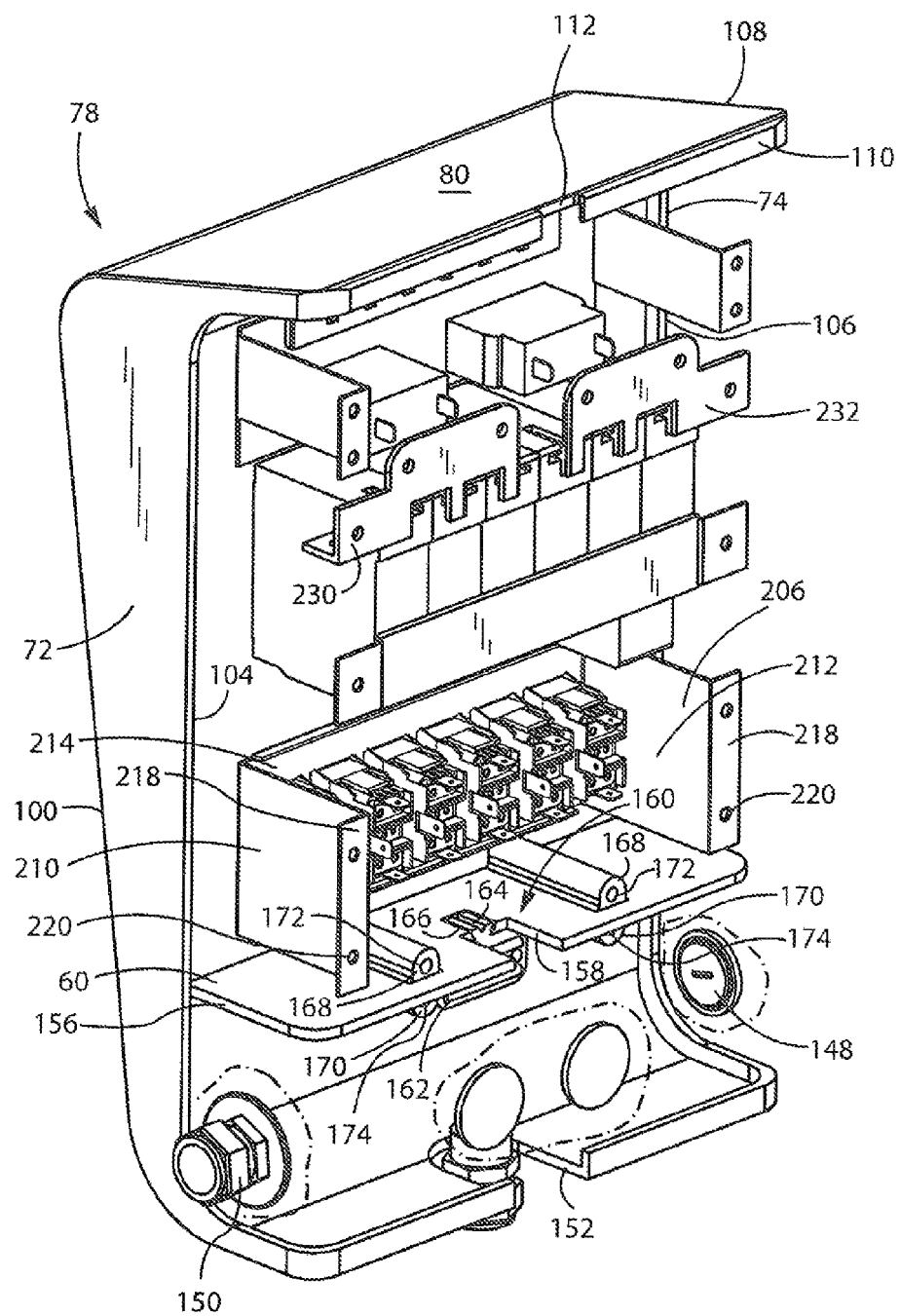
FIG. 4 is a view similar to FIG. 2 with a rear panel or base removed from the power transfer device shown in FIG. 1 exposing various electrical connections and components of the power transfer device.
Figure 5:
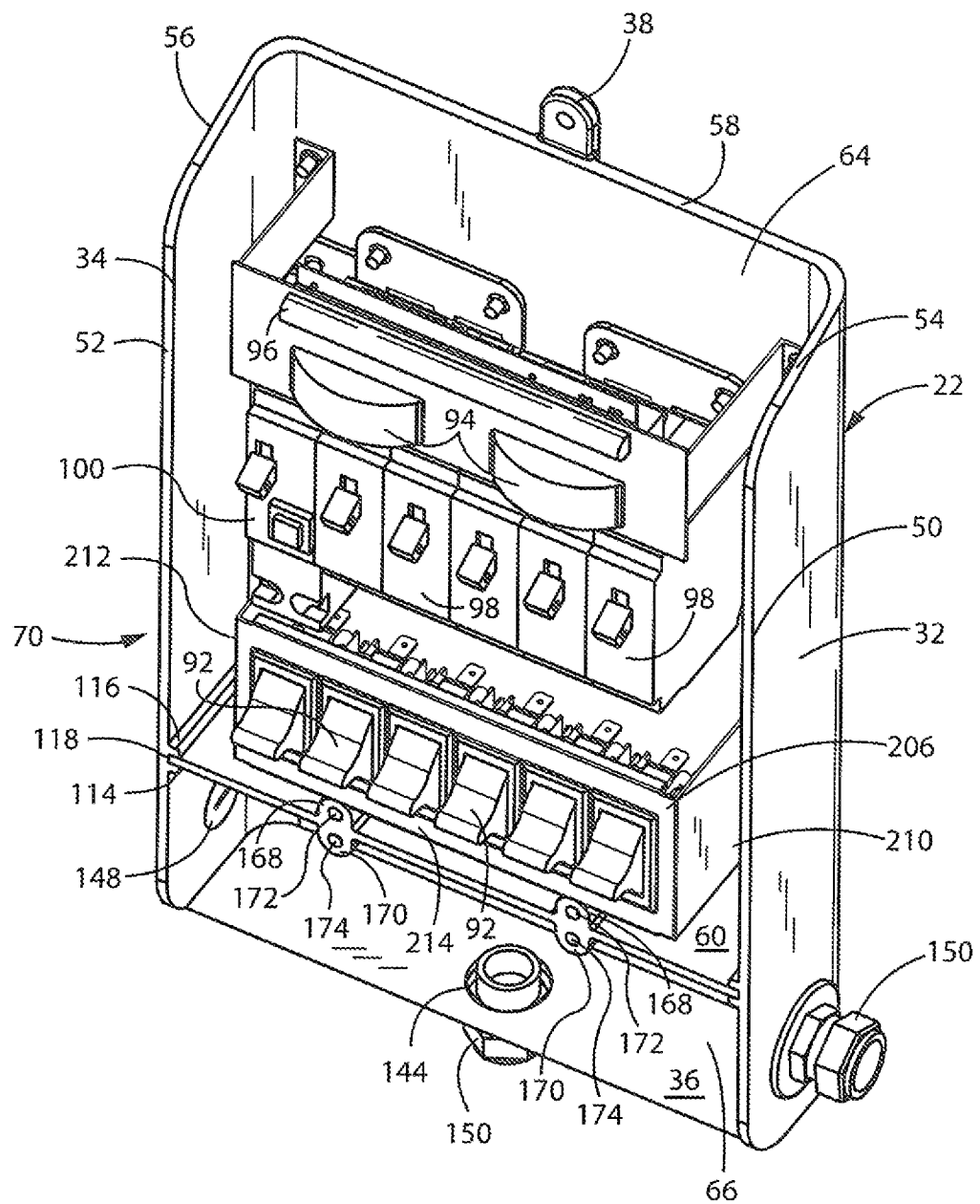
FIG. 5 is a view similar to FIG. 1 with the cover and an enclosure arrangement removed from the power transfer device.
Figure 6:
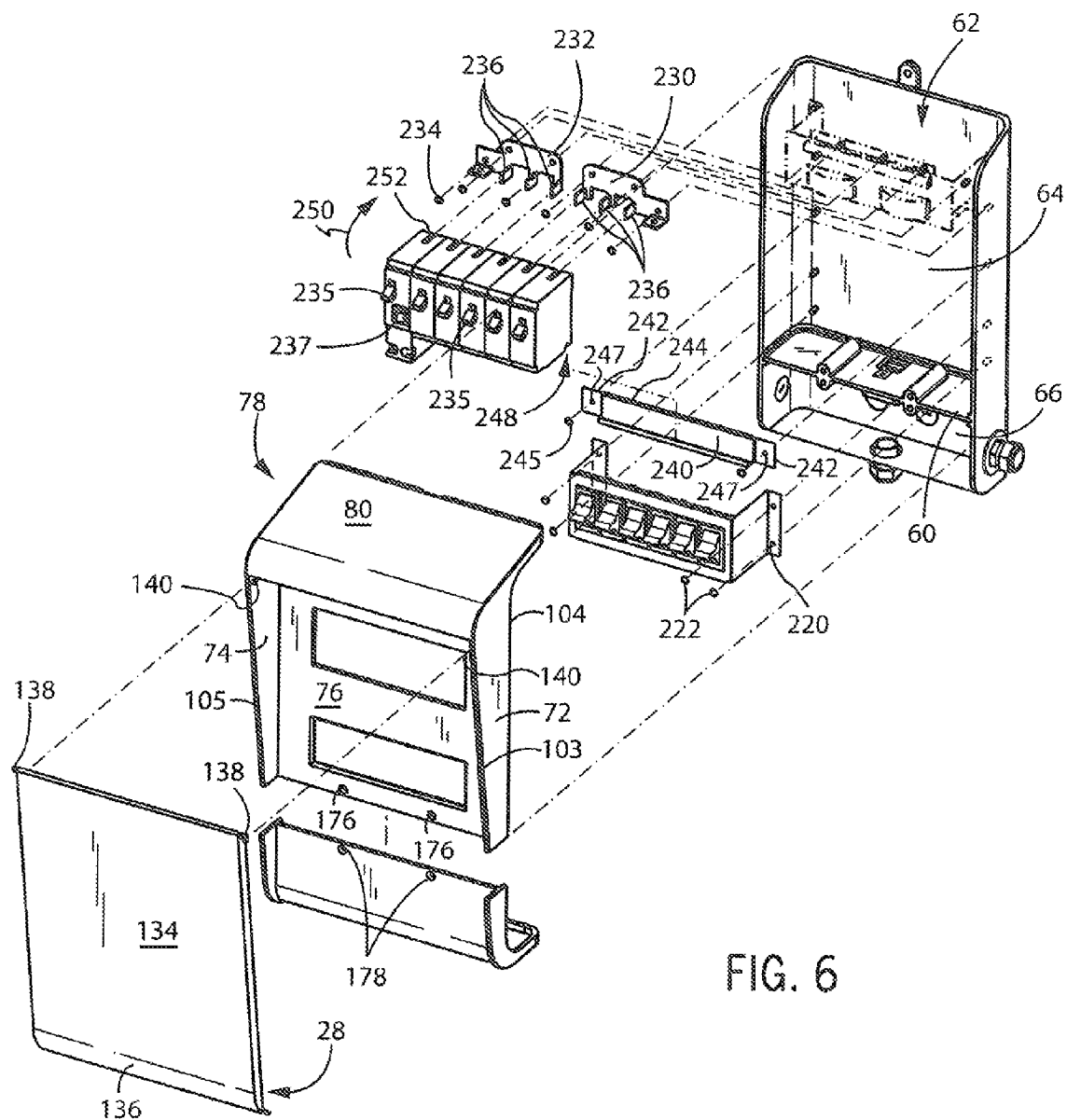
FIG. 6 is an exploded isometric view of the power transfer device shown in FIG. 1.

As best shown in FIGS. 4-6, an intermediate transverse wall 60 is located within the housing 20 and partitions an interior volume 62 of device 10 that is bounded by lower wall 36 and edges 50, 52, 54, 56, 58 of base 22 into a first or upper cabinet section or compartment 64 and a second or lower cabinet section or compartment 66. While the construction of the back wall 30 and the intermediate wall 60 is shown and described in connection with intermediate wall 60 separating the interior volume 62 into upper and lower sections or compartments 64, 66, it is also understood that intermediate wall 60 may be in any other satisfactory orientation as desired in order to form the separate interior sections or compartments. For example, intermediate wall 60 may be vertically oriented so as to form separate side-by-side (left-right) sections or compartments.

The first, or upper, panel 24 is constructed to fit against an upper portion 70 of the base 22 to define the aforementioned upper compartment 64. The first panel 24 has a pair of sidewalls 72, 74 interconnected by a generally planar face or front face 76. An upper end 78 of the first panel 24 has a generally planar top 80 that extends rearward from the sidewalls 72, 74 and, ultimately, fits against the upper end, e.g., edges 54, 56, 58, of the base 22 when the first panel 24 is secured to the base 22. The front face 76 generally overlies the various electrical components of the power transfer switching mechanism 10, which may include switches 92, power input meters 94, a light bar 96, and one or more circuit breakers 98, 100. Representatively, the switches, meters, light bar, and breakers are mounted to base 22 before the first panel 24 is secured thereto but as explained below, first panel 24 is constructed to removably cooperate with base 22 to facilitate servicing of one or more of breakers 98, 100 and/or switches 92, power input meters 94 and/or light bar 96.

The sidewalls 72, 74 of the first panel 24 have respective forward facing surfaces 103, 105 and rearward facing surfaces 104, 106 that are defined by lip portions of the sidewalls 72, 74, respectively, that extend rearwardly past the planar surface of front face 76 of the first panel 24. The forward facing surfaces 103, 105 provide a seat for the front cover 28 when the front cover 28 is attached to the first panel 24. The rearward facing surfaces 104, 106, may overlap and abut against the exterior sides of the sidewalls 32, 34 of the base 22. The peripheral edge 108 of the top 80 of the first panel 24 has a lip 110 that extends downwardly from the top 80 along a plane that is generally perpendicular to the plane of the top 80. When the first panel 24 is mounted to the base 22, the upper end of the base 22 is positioned against the inner surface of the lip 110. In this regard, when the first panel 24 is mounted to the base 22, edges 54, 56, 58 abut against the underside of the top 80. The lip 110 and the rearward lip portions of the sidewalls 72, 74 therefore wrap around the respective upper and side portions of the base 22 to provide an overlapping, snug, and weather tight fit of the panel 24 onto the base 22. At its central area, a notch 112 is formed in the lip 110 to accommodate the hanging tab 38.

A pair of spaced apart ribs 114, 116 (FIG. 5) are formed along the interior surfaces of the back wall 30 and the side walls 32, 34 of base 22. The ribs 114, 116 collectively define a groove or channel 118 sized to receive the intermediate wall 60. In this regard, the intermediate wall 60 may be slid into the channel 118 to be mounted to the base 22. When mounted into place, the wall 60 effectively partitions the interior volume into the aforedescribed upper and lower cavities or compartments 64, 66. Alternatively, one of the ribs 114, 116 may be eliminated so that the other rib forms a ledge that supports the intermediate wall 60, or the edges of intermediate wall 60 may be formed with a channel and the back wall 30 and side walls 32, 34 may include mating ribs that are engaged by a channel formed in the intermediate wall 60. It is understood that intermediate wall 60 may be engaged with the back wall 30 and/or the side walls 32, 34 in any other satisfactory manner that maintains intermediate wall 60 in position relative to base 22.

As described above, the lower compartment 66 is defined by the intermediate wall 60 in combination with back wall 30 and the lower portions of the sidewalls 32, 34. This lower compartment 66 is accessible through an opening that is available when second panel 26 is removed from base 22. It will thus be appreciated that the second panel 26 is sized so as to enclose the access opening of lower compartment 66.

The second panel 26 has a generally L-shaped configuration that is defined by a generally planar front surface 120, a generally flat or planar bottom surface 122, and a curved surface 123 interconnecting the front and bottom surfaces 120, 122. In one embodiment, the second panel 26 is formed as a single unitary member. The width of the second panel 26 is defined by curvilinear sidewalls 124, 126 that align with sidewalls 72, 74 of the first panel 24 when the housing 20 is assembled. The sidewalls 124, 126 extend past the planar front surface 120 of the second panel 26, to define rearwardly extending lip portions of the sidewalls 124, 126.

The peripheral edge of the bottom surface 122 of the second panel 26 has an upturned lip 128 that fits around the lower end of the base 22 when the second panel 26 is mounted to the base 22. More particularly, the lower wall 36 of the base 22 abuts against the upwardly directed underside of the bottom surface 122 when the second panel 26 is mounted to the base 22. The lip 128 overlaps and wraps around the lower end of the base 22 (FIG. 2) and the rearwardly extending lip portions of the sidewalls 124, 126 overlap the lower side portions of the base sidewalls 32, 34, to provide a relatively snug fit of the second panel 26 to the base 22. In a manner further explained below, the second panel 26 is attached to the base 22 by a pair of fasteners 130 (FIG. 3) and the first panel 24 is attached to the base 22 by a pair of fasteners 132 (FIG. 3) to allow independent manipulation of the first and second panels 24, 26, relative to the base 22.

From the foregoing description of the first and second panels 24, 26, respectively and the base 22, it will be appreciated that during the assembly process, the first panel 24 slides onto an upper portion of the base 22 in a direction along a longitudinal axis defined by base 22, and the second panel similarly slides onto a lower portion of the base 22 in a direction along the longitudinal axis of base 22. It will be appreciated that the construction of the base 22 and, more particularly, the manner in which the first and second panels fit around the base, simplifies the assembly process and avoids exposed seams through which moisture may enter when the power transfer switching mechanism 10 is used in outdoor applications.

While the housing of the transfer switching mechanism 10 has been shown and described as having a two-piece enclosure arrangement consisting of first and second panels 24, 26, respectively, it is understood that other alternative designs are possible and are contemplated as being within the scope of the present invention. In particular, it is contemplated that the housing of the transfer switching mechanism 10 may have a one-piece construction. In such an embodiment, the first panel 24 and the second panel 26 are formed as one piece and are engaged as one with the base 22. The intermediate wall 60 is thus captured between the base 22 and the front wall of the one-piece enclosure. In an embodiment such as this, the intermediate wall 60 does not require the capability of securing two separate pieces to the base 22. Rather, the intermediate wall 60 is provided with one set of passages, and one set of fasteners extend through the passages for engagement with the back wall of the base 22 in order to secure the enclosure arrangement and the intermediate wall 60 to the base 22. It is also contemplated that the enclosure arrangement may be formed of more than two sections, with the sections being secured to the base at an intermediate wall between each adjacent pair of sections.

The power transfer switching mechanism 10 is usable in both indoor and outdoor applications. Accordingly, the power transfer mechanism 10 may be used with cover 28, which is pivotally mounted to the first panel 24. The cover 28 has an upper planar section 134 and a lower curved section 136. A pair of tabs 138 (FIG. 3) are formed at the opposite lateral ends of the upper end of the upper section 134 and are designed to be received in notches 140 formed in the sidewalls 72, 74 of the first panel 24. The notches 140 are shaped such that the cover 28 may pivot about a pivot axis 142 (FIG. 3), when the tabs 138 are fully seated in the notches 140. The cover 28 may be rotated or pivoted upward about pivot axis 142 to expose the circuit breakers 98, 100, switches 92, power input meters 94, light bar 96, and second panel 26. It will therefore be appreciated that the cover 28 is sized to fit over the first and second panels 24, 26 when pivoted to the closed position. It will also be appreciated that the curvature of the lower section 136 is substantially matched to the curvature of the second panel 56, and particularly surface 124, so that the lower section of the cover 28 sits flat against the second panel 26 when the cover is fully lowered or closed.

The lower wall 36 of the base 22 has a knockout 144 that allows wires to be routed to and from the volume enclosed by housing 20, as will be described in greater detail below. In one embodiment, the base 22 may have additional knockouts 146, 148 that facilitate the routing of wires to and from the housing 20. In one embodiment, best illustrated in FIGS. 3-6, a fitting 150 is mounted to the base 22 in a conventional manner via a respective knockout 144, 146, 148. In one embodiment, the fitting 150 interfaces with a conduit, such as conduit 18, to route wires carried within the conduit 18 through the housing 20. Alternatively, electrical clamps may be engaged with a respective knockout 144, 146, 148 to secure a sheathed multiple wire electrical cable to housing 20. The second panel 24 has a U-shaped cutout 152 that matches the location of knockout 144 and that receives the fitting 150 to allow the second panel 24 to be slid onto or from the base 22 when the fitting 150 is coupled to the base 22. In this regard, the fitting 150 does not need to be disconnected from the base 22 to remove the second panel 26 in order to expose compartment 66.

Referring particularly now to FIGS. 4-6, the intermediate wall 60 includes a generally planar body 156 having a thickness that allows the body to be slid into the channel 118 formed in the base 22 as described above. A notch, opening or passageway 158 is formed in body 156. The passageway 158 may be generally centered along the longitudinal length of body 156 and oriented to face the interior surface of back wall 30 of base 22. The passageway 158 is designed to enable lead wires to pass between compartments 64, 66 of housing 20 associated with the opposite generally planar sides of intermediate wall 60.

The power transfer switching mechanism 10 has a strain relief member 160 that includes a clamp 162 that is aligned with the passageway 158 so that wires passing through the passageway 158 may be engaged by the clamp 162 and forced toward the portion of the back wall 30 of base 22 generally below the intermediate wall 60. The clamp 162 has a guide member 164 that fits within a guide slot 166 formed adjacent the passageway 158 in the body 156 of the intermediate wall 60. The guide member 164 and guide slot 166 cooperate to define a desired fixed range of movement for the clamp 162 and to center the clamp 162 relative to the passageway 158.

The intermediate wall 60 includes two pairs of elongated bores 168 and 170 that extend through bosses formed on the underside and topside of the body 156, respectively. Bores 168 align with nut receivers 172 formed in the backside of wall 30, as shown in FIG. 2. Similarly, bores 170 align with nut receivers 174 also formed in the backside of the wall 30. The elongated bores 168, 170 also align with openings 176, 178 formed in the first and second panels 24, 26, respectively. In this manner, as shown in FIG. 3, elongated fasteners 130, 132 may be passed through respective openings 176, 178, and a corresponding elongated bore 168, 170, and threadingly engaged with nuts that are non-rotatably placed in nut receivers 174 to couple the first panel 24, the second panel 26, and the intermediate wall 60 to the base 22.

The clamp 162 of the strain relief member 160 has openings that align with threaded nut receivers 184 formed in the backside of wall 30, as shown in FIG. 3, when the clamp 162 is properly positioned within compartment 66. Threaded fasteners pass through the openings and ultimately threadably engage nuts that are non-rotatably placed in nut receivers 184 to secure the clamp 162 to the base 22 and thereby secure those wires or conductors that pass through passageway 158.

As described above, the power transfer switching mechanism 10 is constructed to define first and second compartments, which are illustrated as upper and lower compartments 64 and 66 in the figures. Intermediate wall 60 is mounted to base 22 and separates the upper and lower compartments from one another aside from the communication established by passageway 158. The upper compartment 64 is closed by first panel 24 and, as described above, is configured to receive various electrical components, such as switches 92, power input meters 94, light bar 96, and circuit breakers 98, 100. The lower compartment 66 is designed to facilitate the connection of wires to these various electrical components. In this regard, the entire housing 20 does not need to be disassembled when making the necessary connections to the electrical components and/or manipulating the electrical connections and/or one or more of the electrical components. That is, the wires connected to the electrical components can simply be routed from the upper compartment 64 through passageway 158 that is defined in part by intermediate wall 60 to the lower compartment 66 for connection to various output wires.

In this regard, and with reference to FIGS. 4-6, a series of lead wires can extend from the upper compartment 64 into the lower compartment 66. Each lead wire defines an upper end extending into upper compartment 64 for interconnection with one of the electrical components secured to transfer switch assembly 10 generally behind first panel 24, and a lower end located within lower compartment 66. The upper ends of two such lead wires may be connected to one or more bus bars (not shown) which electrically cooperate with switches 92 and/or a respective bus bar 230, 232 associated with breakers 98, 100 as described further below. Switches 92 are carried on a bracket 206 that is configured to be secured to wall 30 of base 22 such that one or more prongs 208 associated with each respective switch 92 are positioned to removably cooperate with a respective slot, tang, or prong of a corresponding bus bar. Alternatively, each prong 208 could be configured to removably cooperate with a respective wire and/or a corresponding wire terminal connector.

Bracket 206 includes a first bracket side wall 210 and a second bracket side wall 212 that are connected by a window portion 214 of the bracket 206. Switches 92 can be constructed to snap fittingly cooperate with the window portion 214 of bracket 206. A mount flange 218 is formed at each end of the respective side wall 210, 212. Each mount flange 218 includes one or more mounting holes 220 that are configured to cooperate with a boss or post that extends from wall 30 of base 22 to secure bracket 206 relative thereto. Alternatively, a fastener 222 may be provided that cooperates with a respective hole 220 of bracket 206 or a boss or post associated with base 22 for securing bracket 206, and the switches 92 associated therewith, relative to base 22.

Breakers 98, 100 removably cooperate with one or more bus bars 230, 232 which are secured to base 22 by one or more fasteners 234. Alternatively, bus bars 230, 232 may be configured to cooperate with a post, boss, or other such restraining structure that extends from rear wall 30 of base 22. A series of wires that extend between upper and lower chambers 64, 66 electrically connect the respective bus bars, breakers 98, 100, and switches 92 to a feed source, such as utility power of supplemental power generating equipment such as a generator, in a manner as is further described in Applicant's currently co-pending U.S. patent application Ser. No. 12/897,354, now issued as U.S. Pat. No. 8,310,818.

Each bus bar 230, 232 includes a plurality of blades 236 that extend in an outward direction from a generally planar body of the respective bar 230, 232. At least one blade 236 of each bar 230, 232 is configured to cooperate with one of a series of wires to electrify the respective bar, and one or more other blades 236 are oriented to electrically cooperate with a respective breaker 98, 100. In one form, the blades 236 are oriented and positioned to allow positioning of breakers 98, 100 in adjacent proximity to one another. Representatively, blades 236 are shaped and oriented to tolerate electrical connection with a respective 1-inch interchangeable breaker. The blades 236 may be shaped to slidably cooperate with the electrical bus bar slot associated with 1-inch circuit interrupters, 1-inch ground fault circuit interrupters (GFCI), 1-inch arc fault circuit interrupters (AFCI), and/or combinations thereof. Although each of breakers 98, 100 includes a switch 235 that is commonly selectively resettable after a fault condition, it is further envisioned that one or more of breakers 98, 100 can be provided with one or more of an indicator 237 or test button configured to selectively test and/or reset the fault protection associated with the respective breaker 98, 100. Such functionality of breakers 98, 100 is fairly common and readily understood in the art.

Transfer switch assembly 10 includes a support rail 240 that is secured to rear wall 30 of base 22. Support rail 240 includes standoffs 242 that are oriented at the opposite longitudinal ends of support rail 240 such that, when the support rail 240 is secured to base 22, an edge 244 of rail 240 is maintained in a spaced relationship relative to the surface of rear wall 30. One or more fasteners 245 secure rail 240 to base 22. Alternatively, one or more posts or bosses can be formed to extend from wall 30 and cooperate with holes 247 formed in standoff 242 to secure support rail 240 to base 22.

Edge 244 of support rail 240 cooperates with a groove or slot 248 formed laterally along a rail facing side of breakers 98, 100. When breakers 98, 100 are engaged with transfer switch assembly 10, breakers 98, 100 can be loosely supported or "hung" from rail 240 and then rotated in a generally rearward direction toward base 22, indicated by arrow 250, to drive a respective blade 236 into a slot 252 associated with forming the electrical connection of the respective breaker 98, 100 with the respective bus bar 230, 232. The slidable cooperation of the respective breaker 98, 100 with respect to the corresponding blade 236 of a respective bus bar 230, 232 forms a tool-less electrical connection between the respective breaker 98, 100 and the corresponding bus bar 230, 232 associated with a respective circuit of transfer switch assembly 10. Furthermore, supporting and electrically connecting breakers 98, 100 of transfer switch assembly 10 in such a manner allows servicing of discrete breakers 98, 100 without interfering with the position, orientation, or operability of adjacent breakers 98, 100 and wherein one or more of breakers 98, 100 can be provided with various arc fault and/or ground fault circuit protection.

In one embodiment, two lead wires are connected to each of power input meters 94 which in turn are interconnected with the switch bus bars and/or switches and breakers 92, 98, 100. In addition, two lead wires are connected to the light bar 96 and are then interconnected with the bus bar and switches 92. The remaining lead wires may consist of a neutral wire connected in upper compartment 64 to a neutral wire extending through conduit 18 to a main power panel and a ground wire connected in upper compartment 64 to the frame of a transfer switch and/or to a ground wire that also extends through conduit 18 toward a main power panel.

Each lead wire that extends between upper and lower compartments 64, 66 passes adjacent the strain relief member 160, which is mounted adjacent passageway 158 formed in intermediate wall 60. The strain relief member 160 securely clamps the lead wires that extend between upper and lower chambers 64, 66 against the interior surface of back wall 30, so as to fix the length of wires that extend between strain relief member 160 and the upper connection of the respective wires. The length of wires between their lower ends and strain relief member 160 forms a "tail" which can be freely moved about within compartment 66 or moved out of compartment 66, with strain relief member 160 functioning to prevent disengagement of the upper ends of the wires from the upper connections upon such manipulation of the lower ends of respective wires. With this arrangement, the lower ends of wires extend into and are accessible from compartment 66. As described above, the strain relief member 160 mounts to the base 22 by threaded fasteners which allow the strain relief member 160 to move with the fasteners until the fasteners are tightened down to lock the strain relief member 160 in place. This allows the strain relief member 160 to be moved away from the back wall 30 of base 22 and the ends of the respective wires to be pulled between the strain relief member 160 and the back wall 30. Once the desired "tail" length is achieved, the fasteners can be tightened down using a suitable tool to press the strain relief member 160 against the wires to hold the wires against the back wall 30, as evident in FIG. 6.

Power transfer mechanism 10 can be installed by an electrical contractor or a do-it-yourself homeowner, by first mounting power transfer mechanism 10 in a satisfactory location adjacent to or remote from a main power panel. When at least partly disassembled and at least before the upper panel 24 is secured to the base 22, the lead wires are connected to the bus bars 230, 232 associated with breakers 98, 100, which are in turn electrically connected to switches 92, and to optional power input meters 94 and light bar 96. The free ends of the wire leads are then passed through the passageway 158 formed in the intermediate wall 60. The intermediate wall 60 is then advanced into channel 118. Once the respective breakers 98, 100, switches 92, power input meters 94 and light bar 96 have been electrically connected and positioned relative to base 22, upper panel 24 can be engaged with base 22 using fasteners 132 as described above, which also results in fastening of the wall 60 to the base 22.

With cover 28 of power transfer mechanism 10 raised or removed, the second panel 26 can be removed independent of first panel 24 to expose lower compartment 66 and the ends of the respective lead wires. One or more conduits or sheathed conductors and corresponding clamps are then installed in a known manner. The ends of the power input wires are pulled through the passage of the conduit or clamp so as to extend into compartment 66. Lead wires and power input wires can then be cut to length as necessary, and the ends of lead wires and power input wires can be drawn out of compartment 66 to enable the installer to make the connections between the lead wires and the power input wires.

Once connected using appropriate connectors, the lead wires, power input wires, and connectors are placed into compartment 66 and second panel 26 is installed, thereby enclosing compartment 66, the lead wires, the power input wires, and any necessary connectors contained therein. This enables establishment of a direct electrical connection between a remote power inlet box and power transfer mechanism 10, without the need for connecting a flexible cord to a power input receptacle as in the prior art. In this manner, the only step in operation of power transfer mechanism 10 to transfer power from an auxiliary power source such as a generator to a utility or main power panel is to place switches 92 and/or breakers 98, 100 in the appropriate position, so as to transfer power to a main panel as desired in response to operation of a generator. The cover 28 may then be pivoted downward or mounted into place.

The second panel 26 can then be removed or secured over the lower compartment 66 using fasteners 130 without exposing the electrical components and connections associated with upper compartment 64. As noted above, the second panel 26 is removable to expose the lower compartment 66 and the lead wires which extend therein. Such a construction allows an installer to make the necessary electrical connections between the power input wires and the lead wires, as described above, without exposing the electrical connections associated with the upper chamber 64.

After the electrical connections have been made, the second panel 26 is mounted to the base 22 using fasteners 130. After the second panel 26 is placed over the opening to the lower compartment 66 and secured to the base 22, the cover 28 may be installed by inserting the tabs 138 into the notches 140 formed in the upper panel 24. Once the tabs 138 are fully seated in the notches 140, the cover 28 may be pivoted or rotated downward to cover the upper and lower panels 24, 26 and the switches, breakers, meters, and lights positioned therebehind or rotated upwards to expose the operable and assessable switches, breakers, and meters associated with operation of power transfer device 10.

As described above, the power transfer mechanism 10 includes a set of lights or light bar 96 that illuminates the upper panel 24. In one embodiment, the light bar 96 is fed electrical power from the auxiliary power source and thus illuminates the upper panel 24 when the auxiliary power source is supplying power to the power transfer mechanism 10. In another embodiment, a battery (not shown) may provide electrical power to the light bar 96 when utility power is not providing electrical power to the power transfer mechanism. It is also contemplated that the light bar 96 could be supplied with utility power to provide illumination of the upper panel 24 when utility power is providing electrical power to the power transfer mechanism 10. In one embodiment, the light bar 96 has a set of light emitting diodes, but other types of lighting elements could be used.

It will be appreciated that the present invention provides a power switching transfer mechanism 10 that can be manufactured more efficiently than conventional power transfer mechanisms and whose discrete circuit operation and functionality can be individually manipulated to accommodate switch replacement and/or discrete circuit load requirements. More particularly, and with reference to FIGS. 5 and 6, the power transfer mechanism 10 is constructed such that switches 92, circuit breakers 98, 100, power input meters 94, and the light bar 96 are mounted to base 22 such that cover 28 and upper panel 24 can be removed from the mechanism and discrete circuit breakers 98, 100 can be removed and/or replaced without manipulating the orientation and/or operability of adjacent circuit breakers 98, 100. As disclosed above, power transfer mechanism 10 is may be configured to removably accommodate use of 1-inch non-fault protected circuit interrupters or circuit breakers, 1-inch ground-fault circuit interrupters (GFCI), and/or 1-inch arc-fault circuit interrupters (AFCI) for operation with each the discrete circuits as may be required by a given application or intended use of the mechanism. As is understood in the art, such breakers are susceptible to degradation and/or failure, which necessitates the periodic replacement of only the discrete failed breakers. Securing breakers 98, 100 with support rail 240 and bus bars 230, 232 in the manner disclosed above allows discrete breakers 98, 100 to be removed and replaced from transfer switch assembly 10 with the removal of cover 28 and first panel 24 without exposing the electrical connections enclosed in second compartment 66 and without affecting the position and orientation of adjacent breakers and/or exposing the electrical connections associated with still operational breakers. Accordingly, power transfer device 10 can be conveniently installed and maintained.

One embodiment of the invention includes a power transfer arrangement having a base member that includes a back wall that defines first and second ends of the base. An intermediate wall is engaged with the base member at a location between the first and second ends of the back wall. An enclosure arrangement is engaged with the base member and with the intermediate wall. The enclosure arrangement cooperates with the base member to define an interior of the power transfer arrangement and the intermediate wall is configured to separate the interior of the power transfer arrangement into a first interior section and a second interior section. Power transfer switching components are disposed in the first interior section and carried by the base. The power transfer switching components are accessible through the enclosure arrangement when the enclosure arrangement is engaged with the base.

Another embodiment of the invention includes a transfer switch arrangement having a base that includes a first section and a second section. An intermediate wall removably engages the base and defines an end of the first section and an end of the second section. An enclosure arrangement cooperates with the first section of the base and the intermediate wall to define a first compartment and also cooperates with the second section of the back wall and the intermediate wall to define a second compartment. One or more power transfer switching components, which have switch bodies disposed between the enclosure arrangement and the base, removably cooperate with a bus bar that is secured to a rear wall of the base in the first compartment.

In one embodiment, base 22, intermediate wall 60, upper and lower panels 24, 26, and the cover 28 are made of rust-resistant or rust-free material, e.g., plastic.

Various alternatives and embodiments are contemplated as being within the scope of the following claims which particularly point out and distinctly claim the subject matter regarded as the invention.

The invention claimed is:

1. A power transfer arrangement comprising:
   a base member having a back wall defining first and second ends;
   an intermediate wall engaged with the base member at a location between the first and second ends of the back wall;
   an enclosure arrangement engaged with the base member and with the intermediate wall, wherein the enclosure arrangement cooperates with the base member to define an interior, and wherein the intermediate wall is configured to separate the interior into a first interior section and a second interior section; and
   power transfer components disposed in the first interior section and carried by the base member, the power transfer components being accessible through the enclosure arrangement when the enclosure arrangement is engaged with the base,
   the power transfer components comprising:
      at least one bus bar mounted to the base member;
      at least one breaker mounted to the at least one bus bar;
      at least one bracket mounted to the base member;
      a plurality of electrical components mounted to the at least one bracket;
   wherein when the enclosure arrangement is removed from the base member and the intermediate wall, the at least one breaker remains mounted to the at least one bus bar, the plurality of electrical components remain secured to the at least one bracket, and the at least one bus bar and the at least one bracket remain secured to the base member.

2. The power transfer arrangement of claim 1 wherein the intermediate wall is releasably engaged with the base member via a channel formed along an interior surface of the base member, and wherein the intermediate wall is slidably seated in the channel.

3. The power transfer arrangement of claim 2 wherein the intermediate wall includes a receiver and the enclosure arrangement defines a passage aligned with the receiver, and further comprising at least one fastener extending through the passage of the enclosure arrangement for engagement with the receiver for securing the enclosure arrangement and the intermediate wall to the base member.

4. The power transfer arrangement of claim 1 wherein one or more wires extend from the power transfer components through an opening in the intermediate wall, wherein the opening is adjacent to the back wall.

5. The power transfer arrangement of claim 4 wherein the enclosure arrangement comprises first and second panels, wherein the first panel overlies and defines in part the first section of the interior and the second panel overlies and defines in part the second section of the interior and the opening establishes communication between the first section of the interior and the second section of the interior.

6. The power transfer arrangement of claim 5 wherein each of the first and second panels is secured at least in part to the base member via one or more fasteners that extend through the intermediate member into engagement with the base member.

7. The power transfer arrangement of claim 6 wherein the power transfer components are secured to the back wall of the base and removably cooperate with the at least one bus bar, wherein the at least one bus bar is electrically connected to one or more wires that extend through an opening in the intermediate wall from the first section of the interior to the second section of the interior.

8. The power transfer arrangement of claim 1 further comprising a cover movably mounted to the enclosure arrangement to selectively permit and prevent access to the power transfer components.

9. The power transfer arrangement of claim 8 wherein the cover is removable from and mountable to the enclosure arrangement in a tool-free manner.

10. The power transfer arrangement of claim 8 wherein the base member, the intermediate wall and the enclosure arrangement are formed of rust-resistant material.

11. The power transfer arrangement of claim 10 wherein the rust-resistant material comprises a plastic material.

12. A transfer switch arrangement comprising:
    a base having a first section and a second section;
    an intermediate wall removably engaged with the base and defining an end of the first section and an end of the second section;
    an enclosure arrangement that cooperates with the first section of the base and the intermediate wall to define a first compartment and cooperates with the second section of the back wall and the intermediate wall to define a second compartment; and
    power transfer components comprising:
       at least one bus bar secured to a rear wall of the base in the first compartment;
       a plurality of breakers disposed between the enclosure arrangement and the base, the plurality of breakers removably cooperating with the at least one bus bar;
       at least one bracket secured to the rear wall of the base in the first compartment;
       a plurality of electrical components mounted to the at least one bracket;
    wherein when the enclosure arrangement is removed from the base and the intermediate wall, the breakers remain mounted to the at least one bus bar, the plurality of electrical components remain secured to the at least one bracket, and the at least one bus bar and the at least one bracket remain secured to the base.

13. The transfer switch arrangement of claim 12 wherein the enclosure arrangement comprises first and second panels, wherein the first panel overlies and defines in part the first compartment and the second panel overlies and defines in part the second compartment.

14. The transfer switch arrangement of claim 13 wherein each of the first and second panels includes an end wall spaced from the intermediate wall and defining respective ends of the first and second compartments.

15. The transfer switch arrangement of claim 13 wherein each of the first and second panels is secured at least in part to the base via one or more fasteners that extend through the intermediate wall into engagement with the base.

16. The transfer switch arrangement of claim 12 wherein the intermediate wall is removably engaged with the base via a channel associated with the base into which the intermediate wall is slidably received.

17. The transfer switch arrangement of claim 12 wherein the base, the intermediate wall, and the enclosure arrangement are formed of a plastic material.

18. The transfer switch arrangement of claim 12 wherein at least one of the plurality of breakers is further defined as a GFCI interrupter or a AFCI interrupter.

19. The transfer switch arrangement of claim 18 wherein the at least one bus bar is connected to a power source via wires that extend through the intermediate wall between the first compartment and the second compartment.

20. The transfer switch arrangement of claim 19 wherein the intermediate wall includes a notch that faces the back wall and is sized to accommodate the wires.

\* \* \* \* \*